(12) United States Patent
Furukido et al.

(10) Patent No.: US 8,186,721 B2
(45) Date of Patent: May 29, 2012

(54) SPHERICAL ANNULAR SEAL MEMBER, EXHAUST PIPE JOINT DEVICE USING THE SAME, AND METHOD OF MANUFACTURING SPHERICAL ANNULAR SEAL MEMBER

(75) Inventors: Takeshi Furukido, Fujisawa (JP);
Toshihiko Shimura, Fujisawa (JP);
Tomoyuki Inagaki, Fujisawa (JP);
Masao Tomomatsu, Nakatsu (JP)

(73) Assignee: Oiles Corporation, Tokyo (JP)

( * ) Notice: Subject to any disclaimer, the term of this patent is extended or adjusted under 35 U.S.C. 154(b) by 687 days.

(21) Appl. No.: 12/441,605

(22) PCT Filed: May 19, 2006

(86) PCT No.: PCT/JP2006/310066
§ 371 (c)(1),
(2), (4) Date: Mar. 17, 2009

(87) PCT Pub. No.: WO2007/135722
PCT Pub. Date: Nov. 29, 2007

(65) Prior Publication Data
US 2011/0049869 A1    Mar. 3, 2011

(51) Int. Cl.
*F16L 27/04* (2006.01)

(52) U.S. Cl. ........................................ 285/267; 277/610

(58) Field of Classification Search .................. 285/267; 277/910
See application file for complete search history.

(56) References Cited

U.S. PATENT DOCUMENTS

| | | | | |
|---|---|---|---|---|
| 3,607,746 A | * | 9/1971 | Caruso | 508/167 |
| 4,559,249 A | * | 12/1985 | Arigaya et al. | 428/34.1 |
| 5,615,479 A | * | 4/1997 | Maeda et al. | 29/888.3 |
| 5,898,022 A | * | 4/1999 | Maples | 508/113 |
| 6,371,491 B1 | * | 4/2002 | Schultz et al. | 277/627 |
| 6,649,573 B2 | * | 11/2003 | Mitrovich | 508/131 |

FOREIGN PATENT DOCUMENTS

| | | |
|---|---|---|
| JP | 2004-098316 | 4/2004 |
| JP | 2005-127391 | 5/2005 |
| JP | 2005-325440 | 11/2005 |

* cited by examiner

*Primary Examiner* — Aaron Dunwoody
(74) *Attorney, Agent, or Firm* — Nixon & Vanderhye P.C.

(57) ABSTRACT

A spherical annular seal member includes a spherical annular base member defined by a cylindrical inner surface, a partially convex spherical outer surface, and large- and small-diameter-side annular end faces and of the partially convex spherical outer surface, as well as an expandable annular coating layer formed integrally on the cylindrical inner surface of the spherical annular base member. The coating layer consists of a mixture of acid-treated graphite and wax.

4 Claims, 5 Drawing Sheets

SPHERICAL ANNULAR SEAL MEMBER, EXHAUST PIPE JOINT DEVICE USING THE SAME, AND METHOD OF MANUFACTURING SPHERICAL ANNULAR SEAL MEMBER

This application is the U.S. national phase of International Application No. PCT/JP2006/310066 filed 19 May 2006 which designated the U.S., the entire contents of which is hereby incorporated by reference.

TECHNICAL FIELD

The present invention relates to a spherical annular seal member, an automobile exhaust pipe joint device using the same, and a method of manufacturing a spherical annular seal member.

BACKGROUND ART

[Patent Document 1] JP-B-S58-21144

Exhaust gases from an automobile engine are led from the engine into an exhaust pipe disposed on such as a chassis frame and are exhausted to the atmosphere, but this exhaust pipe is repeatedly subjected to bending stress owing to the torque reaction, inertial force, and the like of the engine. Particularly in the case of a front wheel drive (FWD) transverse engine, as compared with a longitudinal engine, this bending stress becomes quite large. Accordingly, there are risks in that the vibration of the engine can be transmitted through an exhaust pipe suspension into the vehicle compartment and cause noise, and or can cause malfunctions such as the fatigue breakage of the exhaust pipe. To overcome such problems, a means has conventionally been adopted in which an exhaust pipe joint device having a spherical pipe joint (spherical annular seal member) is disposed at a predetermined portion of the exhaust pipe to absorb the stress (JP-B-58-21144).

Such a spherical pipe joint is in many cases used in such a way that its partially convex spherical outer surface is brought into slidable contact with a partially concave spherical inner surface of a flange member secured to an end portion of a downstream-side exhaust pipe, and its cylindrical inner surface is fitted to an outer surface of a pipe end portion of an upstream-side exhaust pipe. Thus, the stress is absorbed by the relative sliding movement of the partially convex spherical outer surface with respect to the partially concave spherical inner surface of the flange member.

In the front wheel drive (FWD) transverse engine, in recent years, since the exhaust pipe (manifold) is provided on the rear side of the engine, a large force in the twisting direction (in the direction of rotation about a pipe axis of the exhaust pipe), in particular, is applied to the exhaust pipe connected to the manifold, in addition to a force in the shearing direction (in a direction perpendicular to the pipe axis direction of the exhaust pipe). This force is applied to the exhaust pipe joint device as well.

If the large force in the twisting direction is applied to the exhaust pipe joint device, stick-slip occurs between the cylindrical inner surface of the spherical pipe joint and the pipe end portion of the upstream-side exhaust pipe, which are fitted to each other, and abnormal noise attributable to the stick-slip is generated, imparting discomfort to the driver and passengers.

DISCLOSURE OF THE INVENTION

Problems that the Invention is to Solve

The present invention has been devised in view of the above-described aspects, and its object is to provide a spherical annular seal member which makes it possible to reliably fix the spherical annular seal member to the pipe end portion of the upstream-side exhaust pipe, and which, even if the force in the twisting direction (rotating direction) is applied from the downstream-side exhaust pipe to the spherical annular seal member, does not generate abnormal noise attributable to stick-slip and the like between the cylindrical inner surface and the pipe end portion of the upstream-side exhaust pipe fitted to each other, and does not impart discomfort to the driver, as well as an automobile exhaust pipe joint device using the same and a manufacturing method which makes it to manufacture such a spherical annular seal member easily in a short time.

Means for Solving the Problems

In accordance with the present invention, there is provided a spherical annular seal member comprising: a spherical annular base member defined by a cylindrical inner surface, a partially convex spherical outer surface, and large- and small-diameter-side annular end faces of the partially convex spherical outer surface; and an expandable annular coating layer formed integrally on the cylindrical inner surface of the spherical annular base member, the coating layer being composed of a mixture of acid-treated graphite and wax.

The spherical annular seal member in accordance with the present invention has the annular coating layer formed integrally on the cylindrical inner surface of the spherical annular base member and composed of a mixture of a heat-expandable acid-treated graphite and wax. Therefore, if the spherical annular seal member is used in an exhaust pipe joint device for resiliently coupling the upstream-side exhaust pipe and the downstream-side exhaust pipe by means of resilient coupling means in such a manner as to be capable of relative angular displacement, such that the spherical annular seal member is fitted to an outer surface of the pipe end portion of the upstream-side exhaust pipe at an annular inner surface of that coating layer, is in contact with a flange secured to the upstream-side exhaust pipe at a large-diameter-side annular end face of that spherical annular base member, and is in slidable contact with a partially concave spherical inner surface of a seal seat member secured to the downstream-side exhaust pipe at a partially convex spherical outer surface of that spherical annular base member, then the heat-expandable annular coating layer formed integrally on the cylindrical inner surface of the spherical annular base member expands in such a manner as to tighten the pipe end portion of the upstream-side exhaust pipe owing to the heat of the exhaust gases flowing in the exhaust pipe. Consequently, the integration of the spherical annular seal member and the outer surface of the pipe end portion of the upstream-side exhaust pipe is accomplished. Thus, it is possible to reliably fix the spherical annular seal member to the pipe end portion of the upstream-side exhaust pipe, and even in a case where a force in the twisting direction (rotating direction) is applied from the downstream-side exhaust pipe to the spherical annular seal member, sliding movement is not caused between the inner surface of the annular coating layer and the outer surface of the pipe end portion of the upstream-side exhaust pipe and between the large-diameter-side annular end face of the spherical annular base member and the flange. Hence, it is possible to obtain a spherical annular seal member which does not generate abnormal friction noise caused by the stick-slip and the like and which does not impart discomfort to the driver.

In the spherical annular seal member in accordance with the present invention, the spherical annular base member is preferably obtained by subjecting a heat-resistant material containing expanded graphite and a reinforcing member made from a metal wire net to compression forming, the heat-resistant material filling gaps in the reinforcing member made from the metal wire net.

In accordance with the present invention, there is provided an exhaust pipe joint device comprising: an upstream-side exhaust pipe; a downstream-side exhaust pipe having an end face opposing an end face of the upstream-side exhaust pipe with a gap left therebetween; a flange secured to an outer surface of a pipe end portion of the upstream-side exhaust pipe; a seal seat member secured to a pipe end portion of the downstream-side exhaust pipe and having a partially concave spherical inner surface; resilient coupling means for resiliently coupling the upstream-side exhaust pipe and the downstream-side exhaust pipe in such a manner as to be capable of relative angular displacement; and the spherical annular seal member according to one of the above-described aspects. Here, the spherical annular seal member is fitted to the outer surface of the pipe end portion of the upstream-side exhaust pipe at an inner surface of the annular coating layer, is in contact with the flange at a large-diameter-side annular end face of the spherical annular base member, and is in slidable contact with the partially concave spherical inner surface of the seal seat member at a partially convex spherical outer surface of the spherical annular base member.

According to the exhaust pipe joint device in accordance with the present invention, the spherical annular seal member at the partially convex spherical outer surface of the spherical annular base member is in slidable contact with the partially concave spherical inner surface of the seal seat member secured to the pipe end portion of the downstream-side exhaust pipe. As a result, the relative angular displacement occurring between the upstream-side exhaust pipe and the downstream-side exhaust pipe is allowed by the sliding movement between the partially convex spherical outer surface of the spherical annular base member and the partially concave spherical inner surface of the seal seat member. Meanwhile, the sealing between the upstream-side exhaust pipe and the downstream-side exhaust pipe is effected by the contact between the large-diameter-side annular end face of the spherical annular base member and the flange, in addition to the close contact between the partially convex spherical outer surface of the spherical annular base member and the partially concave spherical inner surface of the seal seat member.

Further, according to the exhaust pipe joint device in accordance with the present invention, the heat-expandable annular coating layer formed integrally on the cylindrical inner surface of the spherical annular base member expands in such a manner as to tighten the pipe end portion of the upstream-side exhaust pipe owing to the heat of the exhaust gases flowing in the exhaust pipe. Consequently, the integration of the spherical annular seal member and the outer surface of the pipe end portion of the upstream-side exhaust pipe is accomplished. Thus, it is possible to reliably fix the spherical annular seal member to the pipe end portion of the upstream-side exhaust pipe, and even in a case where a force in the twisting direction (rotating direction) is applied from the downstream-side exhaust pipe to the spherical annular seal member, sliding movement is not caused between the inner surface of the annular coating layer and the outer surface of the pipe end portion of the upstream-side exhaust pipe and between the large-diameter-side annular end face of the spherical annular base member and the flange. Hence, it is possible to obtain an exhaust pipe joint device which does not generate abnormal friction noise caused by the stick-slip and the like and which does not impart discomfort to the driver.

Furthermore, in accordance with the present invention, there is provided a method of manufacturing a spherical annular seal member which is used particularly in an exhaust pipe joint and which includes a spherical annular base member defined by a cylindrical inner surface, a partially convex spherical outer surface, and large- and small-diameter-side annular end faces of the partially convex spherical outer surface, and a heat-expandable annular coating layer formed on the cylindrical inner surface of the spherical annular base member, comprising the steps of: preparing a heat-resistant material formed of a sheet containing expanded graphite; spreading onto one surface of the heat-resistant material a mixture of an acid-treated graphite powder prior to expansion treatment and a wax powder over a range extending from an end portion of the heat-resistant material by a predetermined longitudinal length, heating the mixture to a melting point of the wax or to a temperature higher than the same to melt the wax powder, and then solidifying the mixture by leaving it to stand to a normal temperature; passing the heat-resistant material containing the solidified mixture through a pair of rolls so as to pressure bond the mixture to the surface of the heat-resistant material as a coating formed layer; preparing a reinforcing member made from a metal wire net obtained by weaving or knitting a fine metal wire; forming a superposed assembly by superposing the reinforcing member made from the metal wire net on a surface of the heat-resistant material with the coating formed layer formed thereon, which is opposite to a surface where the coating formed layer has been formed, and convoluting the superposed assembly spirally with the coating formed layer placed on an inner side, such that the heat-resistant material is convoluted with one more turn, to thereby form a tubular base member in which the coating formed layer is exposed over an entire circumference on an inner peripheral side, and the heat-resistant material is exposed over the entire circumference on an outer peripheral side; and fitting the tubular base member over an outer peripheral surface of a core of a die, placing the core in the die, and compressing the tubular base member in the die in an axial direction of the core. Here, the spherical annular base member is constructed so as to be provided with structural integrity as the heat-resistant material containing the expanded graphite and the reinforcing member made from the metal wire net are compressed and intertwined with each other. The spherical annular base member has the reinforcing member which comprises the compressed metal wire net and the heat-resistant material which contains the expanded graphite and which fills meshes of the metal wire net of the reinforcing member and is compressed in such a manner as to be formed integrally with the reinforcing member in mixed form. The heat-expandable annular coating layer constituted by the compressed mixture of the acid-treated graphite prior to expansion treatment and the wax is formed on the cylindrical inner surface of the spherical annular base member in such a manner as to be exposed to an outside.

In the manufacturing method in accordance with the present invention, as the acid-treated graphite powder, one which is fabricated by the following manufacturing method is suitably used. While concentrated sulfuric acid of a 98% concentration is being agitated, a predetermined amount of a 60% aqueous solution of hydrogen peroxide is added to it as an oxidizing agent, so as to prepare a reaction solution. A predetermined amount of a natural flake graphite powder is added to this reaction solution, and reaction is allowed to take place for a predetermined time. After the reaction, the acid-treated graphite powder is separated by suction filtration, and a cleaning operation is repeated in which the acid-treated graphite powder is agitated in water for a predetermined time and is then subjected to suction filtration, thereby sufficiently removing the sulfuric acid content from the acid-treated graphite powder. Then, the acid-treated graphite powder with the sulfuric acid content sufficiently removed is dried in a drying furnace, and this powder is used as the acid-treated graphite powder. The acid-treated graphite powder thus obtained has a property whereby the gaps between graphite layers are expanded by the effect of heat.

According to the manufacturing method in accordance with the invention, in forming the heat-expandable coating layer on one surface of the heat-resistant material, which is formed of a sheet containing expanded graphite, over a range extending from an end portion of the heat-resistant material by a predetermined longitudinal length, the acid-treated graphite and the wax are made into a mixture in powder form. Therefore, the formation of the heat-expandable coating layer is effected by spreading the mixture onto the heat-resistant material formed of the sheet containing the expanded graphite. Hence, the adjustment of the amount of spreading is facilitated, and the operating efficiency therefore improves remarkably. In addition, since the melting point of the wax is a relatively low temperature of 50 to 150° C., the fabrication of the final coating layer can be performed in a short time.

In the present invention, in terms of the compounding ratio of the wax to the acid-treated graphite in the coating layer, the weight of the wax is preferably in the range of 0.2 to 1.5 times the weight of the acid-treated graphite. The wax functions as an adhesive agent when the coating layer formed of the mixture is pressure bonded to the surface of the heat-resistant material formed of the sheet containing the expanded graphite. The adhesive force of this wax is sufficient if it is of such a measure that the coating layer does not drop while the spherical annular seal member is built into the exhaust pipe joint.

In the present invention, as the wax for forming the annular coating layer, a hydrocarbon-based wax whose melting point is 50 to 150° C. is suitably used. As the hydrocarbon-based wax, it is possible to cite such as a petroleum wax such as paraffin wax (whose principal component is a straight-chain hydrocarbon with a carbon number of 20 to 40) extracted from a lubricant component of petroleum, or microcrystalline wax (whose principal component is a non-straight-chain hydrocarbon with a carbon number of 30 to 60) extracted from a fraction of a heavy lubricant of petroleum, or a synthetic wax such as Fisher-Tropsch wax (whose principal component is a hydrocarbon with a carbon number of 17 to 78) or a polyolefin wax such as polyethylene wax and polypropylene wax. These waxes may be used singly or in combination.

ADVANTAGES OF THE INVENTION

According to the present invention, it is possible to provide a spherical annular seal member which makes it possible to reliably fix the spherical annular seal member to the pipe end portion of the upstream-side exhaust pipe, and which, even if the force in the twisting direction (rotating direction) is applied from the downstream-side exhaust pipe to the spherical annular seal member, does not generate abnormal noise attributable to stick-slip and the like, and does not impart discomfort to the driver and passengers, as well as an automobile exhaust pipe joint device using the same. In addition, according to the manufacturing method in accordance with the invention, a spherical annular seal member having a heat-expandable annular coating layer on the cylindrical inner surface of the spherical annular base member can be manufactured easily in a short time.

Hereafter, a detailed description will be given of the present invention and its embodiment with reference to an example illustrated in the drawings. It should be noted that the present invention is not limited to the embodiment.

BEST MODE FOR CARRYING OUT THE INVENTION

<Concerning Acid-treated Graphite Powder>

While 300 parts by weight of concentrated sulfuric acid of a 98% concentration is being agitated, 5 parts by weight of a 60% aqueous solution of hydrogen peroxide is added to it as an oxidizing agent, and this solution is used as a reaction solution. This reaction solution is cooled and kept at a temperature of 10° C., 100 parts by weight of natural flake graphite powder having a particle size of 30 to 80 meshes is added to it, and reaction is allowed to take place for 30 minutes. After the reaction, the acid-treated graphite powder is separated by suction filtration, and a cleaning operation is repeated twice in which the acid-treated graphite powder is agitated in 300 parts by weight of water for 10 minutes and is then subjected to suction filtration, thereby sufficiently removing the sulfuric acid content from the acid-treated graphite powder. Then, the acid-treated graphite powder with the sulfuric acid content sufficiently removed is dried for 3 hours in a drying furnace held at a temperature of 110° C., and this powder is used as an acid-treated graphite powder.

<Concerning Heat-Resistant Material>

The above-described acid-treated graphite powder is separately fabricated, and the acid-treated graphite powder prior to expansion treatment is subjected to heating (expansion) treatment for 1 to 10 seconds at temperatures of 950 to 1200°

C. to produce cracked gas. The gaps between graphite layers are expanded by the gas pressure to form expanded graphite particles (expansion rate: 200 to 300 times). These expanded graphite particles are subjected to roll forming by a twin roller apparatus, thereby fabricating an expanded graphite sheet having a desired thickness. This expanded graphite sheet is used as a heat-resistant material.

<Concerning Reinforcing Member>

As a reinforcing member, a metal wire net is used which is formed by weaving or knitting one or more wire members including, as an iron-based wire, a stainless steel wire made of such as austenitic stainless steels SUS 304 and SUS 316, a ferritic stainless steel. SUS 430, or an iron wire (JIS-G-3532) or a galvanized iron wire (JIS-G-3547), or, as a copper-based wire, a wire member made of a copper-nickel alloy (cupro-nickel) wire, a copper-nickel-zinc alloy (nickel silver) wire, a brass wire, or a beryllium copper wire. As the wire diameter of the fine metal wire forming the metal wire net, a fine metal wire having a diameter of 0.10 to 0.32 mm or thereabouts is used, and a metal wire net whose meshes are 3 to 6 mm or thereabouts is suitably used.

Next, referring to the drawings, a description will be given of the method of manufacturing the spherical annular seal member composed of the above-described constituent materials.

Figure 2:
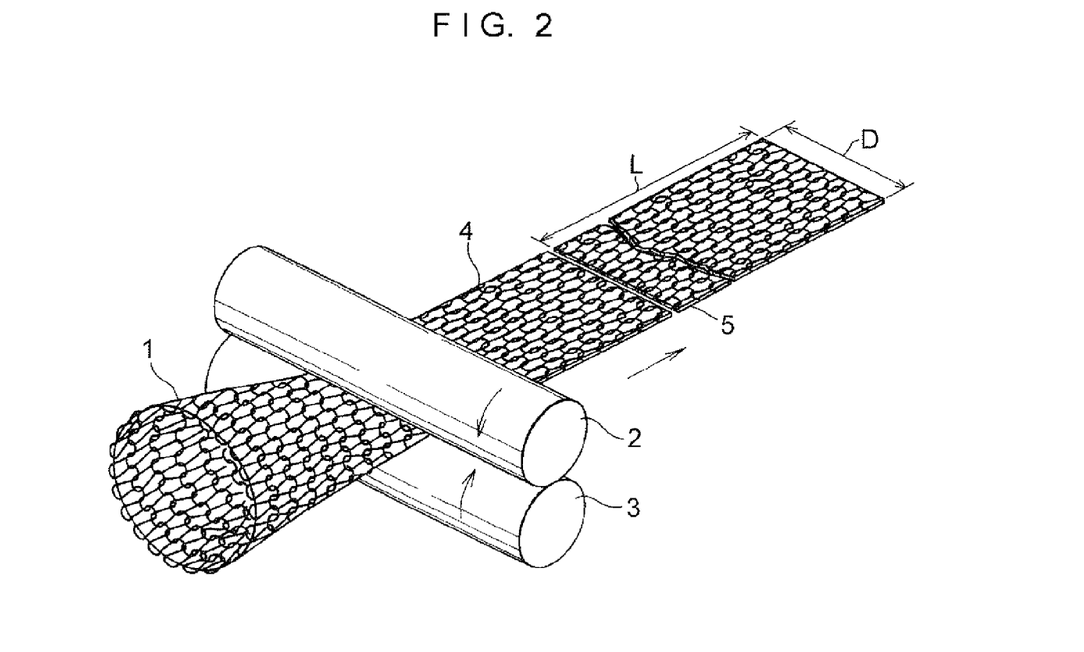
FIG. 2 is a diagram explaining a method of forming a reinforcing member in a process of manufacturing the spherical annular seal member in accordance with the present invention.

(First Process) As shown in FIG. 2, a tubular metal wire net 1 formed by knitting fine metal wires into a cylindrical shape is passed between rollers 2 and 3, thereby fabricating a belt-shaped metal wire net 4 having a predetermined width D. A reinforcing member 5 obtained by cutting the belt-shaped metal wire net 4 into a predetermined length L is prepared.

Figure 3:
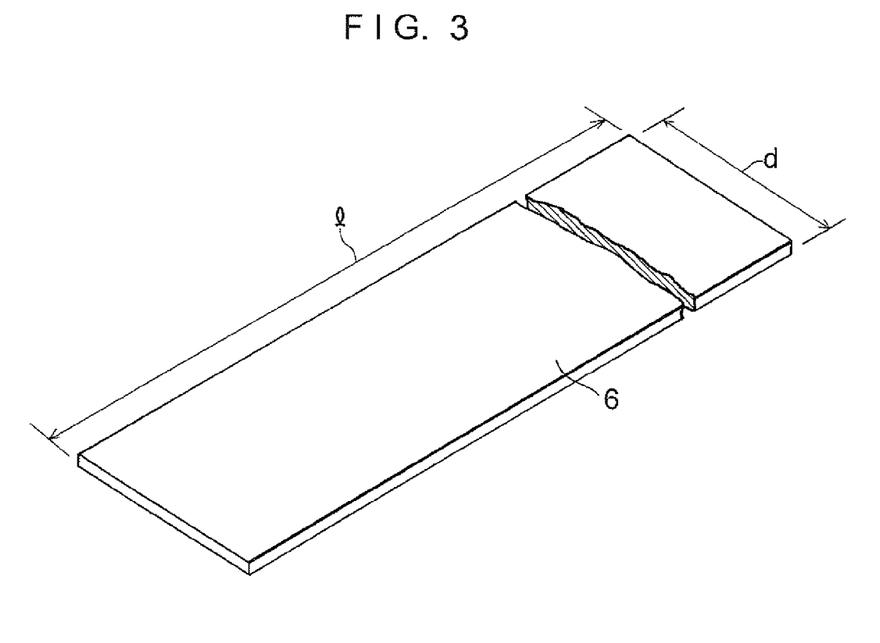
FIG. 3 is a perspective view of a heat-resistant material in the process of manufacturing the spherical annular seal member in accordance with the present invention.

(Second Process) As shown in FIG. 3, a heat-resistant sheet material (a sheet formed of expanded graphite) 6 is prepared which is cut so as to have a width d of $1.10 \times D$ to $2.10 \times D$ with respect to the width D of the reinforcing member 5 and a length l of $1.30 \times L$ to $2.70 \times L$ with respect to the length L of the reinforcing member 5.

(Third Process) The acid-treated graphite powder and wax powder are prepared, and a wax powder having a weight which is 0.2 to 1.5 times the weight of the acid-treated graphite powder is measured. The two powders are uniformly mixed to produce a mixture (mixed powder). As the wax powder, hydrocarbon-based wax, specifically, paraffin wax, microcrystalline wax, Fisher-Tropsch wax, and polyolefin wax are used singly, or two or more kinds of them are used in admixture.

Figure 4:
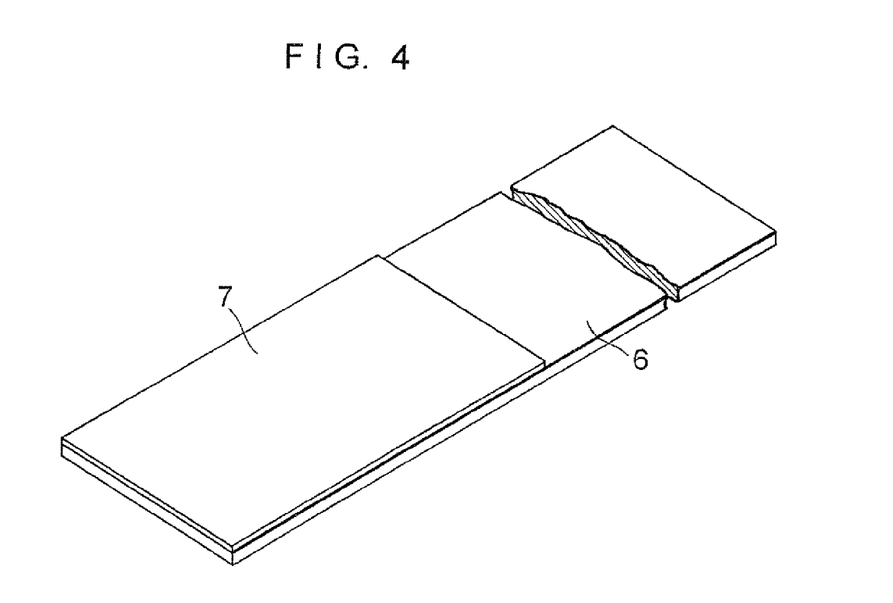
FIG. 4 is a perspective view of the heat-resistant material and a coating formed layer in the process of manufacturing the spherical annular seal member in accordance with the present invention.

(Fourth Process) As shown in FIG. 4, after the mixture of the acid-treated graphite powder and the wax powder is spread onto the surface of one end portion of the heat-resistant material 6 by the portion of a predetermined length, the spread mixture of the acid-treated graphite powder and the wax powder is then heated to the melting point of the wax or to a temperature higher than the melting point to melt the wax in the mixture, and is then solidified by being left to stand to the normal temperature (20 to 25° C.). A solid material layer of the mixture is thereby formed on the surface of the heat-resistant material 6. Subsequently, the heat-resistant material 6 including the solid material layer is subjected to rolling by being passed through a pair of rollers (not shown), thereby forming a coating formed layer 7 of the mixture which is pressure bonded to the surface of the heat-resistant material 6. Incidentally, when only the heat-resistant material 6 (thickness of the heat-resistant material 6: 0.40 mm) with the coating formed layer 7 formed thereon and having a combined thickness of 0.60 to 0.70 mm was heated to 350° C., the thickness became 8.50 mm.

Figure 5:
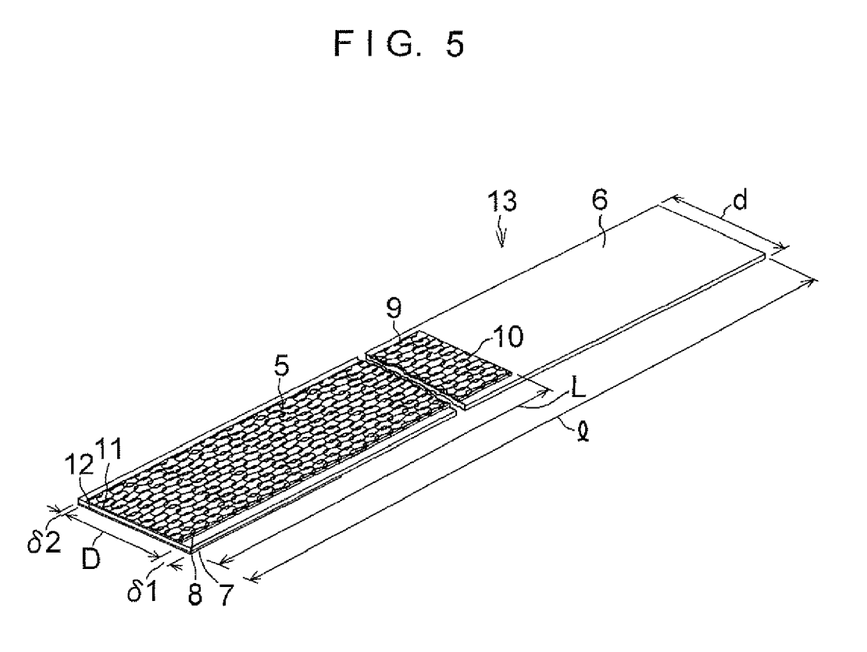
FIG. 5 is a perspective view illustrating a superposed assembly in the process of manufacturing the spherical annular seal member in accordance with the present invention.

(Fifth Process) A superposed assembly 13, in which the reinforcing member 5 is superposed on the reverse surface of the heat-resistant material 6 opposite to the surface where the coating formed layer 7 has been formed, is obtained as follows: To ensure that the heat-resistant material 6 is wholly exposed at least on a large-diameter-side end face 25 which is an annular end face on one axial end side of a partially convex spherical outer surface 24 in a spherical annular seal member 28, which will be described later, as shown in FIG. 5, the heat-resistant material 6 is made to project in the widthwise direction by $0.1 \times D$ to $0.8 \times D$ from one widthwise end 8 of the reinforcing member 5, which becomes the large-diameter-side end face 25 of the partially convex spherical outer surface 24. Also, the amount of widthwise projection, $\delta 1$, of the heat-resistant material 6 from the end 8 becomes greater than the amount of its widthwise projection, $\delta 2$, from the other widthwise end 9 of the reinforcing member 5, which becomes a small-diameter side annular end face side of the partially convex spherical outer surface. Also, the heat-resistant material 6 is made to project in the longitudinal direction by $0.30 \times L$ to $1.70 \times L$ from at one longitudinal end 10 of the reinforcing member 5. Also, the other longitudinal end 11 of the reinforcing member 5 and a longitudinal end 12 of the heat-resistant material 6 corresponding to that end 11 are made to substantially agree with each other. Furthermore, the reinforcing member 5 and the heat-resistant material 6 are matched in the widthwise direction and the longitudinal direction.

Figure 6:
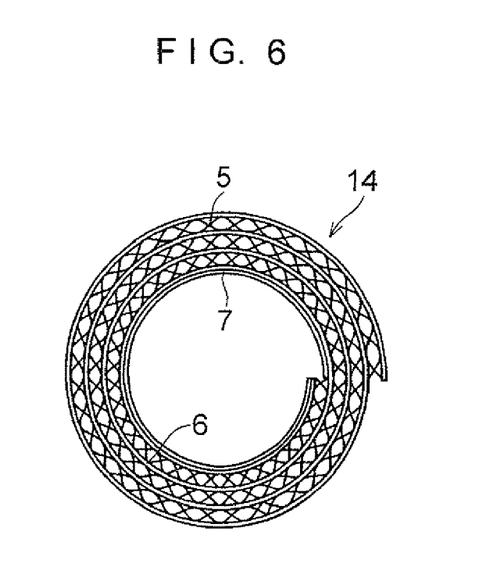
FIG. 6 is a plan view of a tubular base member in the process of manufacturing the spherical annular seal member in accordance with the present invention.
Figure 7:
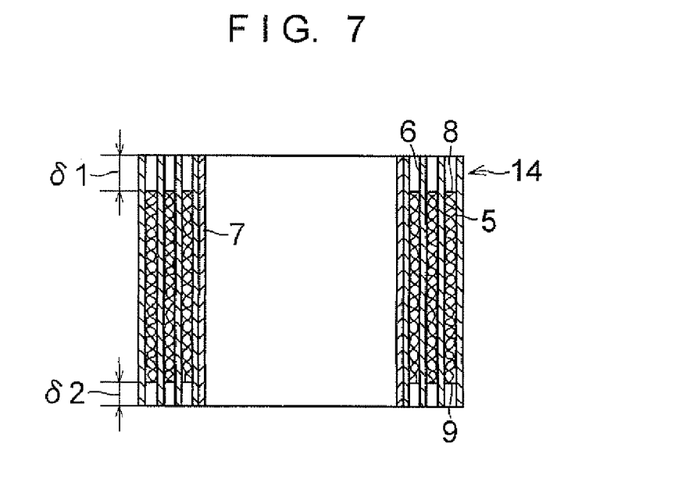
FIG. 7 is a vertical cross-sectional view of the tubular base member shown in FIG. 6.

(Sixth Process) As shown in FIG. 6, the superposed assembly 13 is convoluted spirally with the coating formed layer 7 placed on the inner side, such that the heat-resistant material 6 is convoluted with one more turn, thereby forming a tubular base member 14 in which the coating formed layer 7 is exposed over the entire circumference on the inner peripheral side, while the heat-resistant material 6 is exposed over the entire circumference on the outer peripheral side. As the heat-resistant material 6, one is prepared in advance which has a length l of $1.30 \times L$ to $2.70 \times L$ with respect to the length L of the reinforcing member 5 so that the number of winding turns of the heat-resistant material 6 in the tubular base member 14 becomes greater than the number of winding turns of the reinforcing member 5. In the tubular base member 14, as shown in FIG. 7, the heat-resistant material 6 on its one widthwise end side projects in the widthwise direction by $\delta 1$ from the one end 8 of the reinforcing member 5, and the heat-resistant material 6 on its other widthwise end side projects in the widthwise direction by $\delta 2$ from the other end 9 of the reinforcing member 5.

Figure 8:
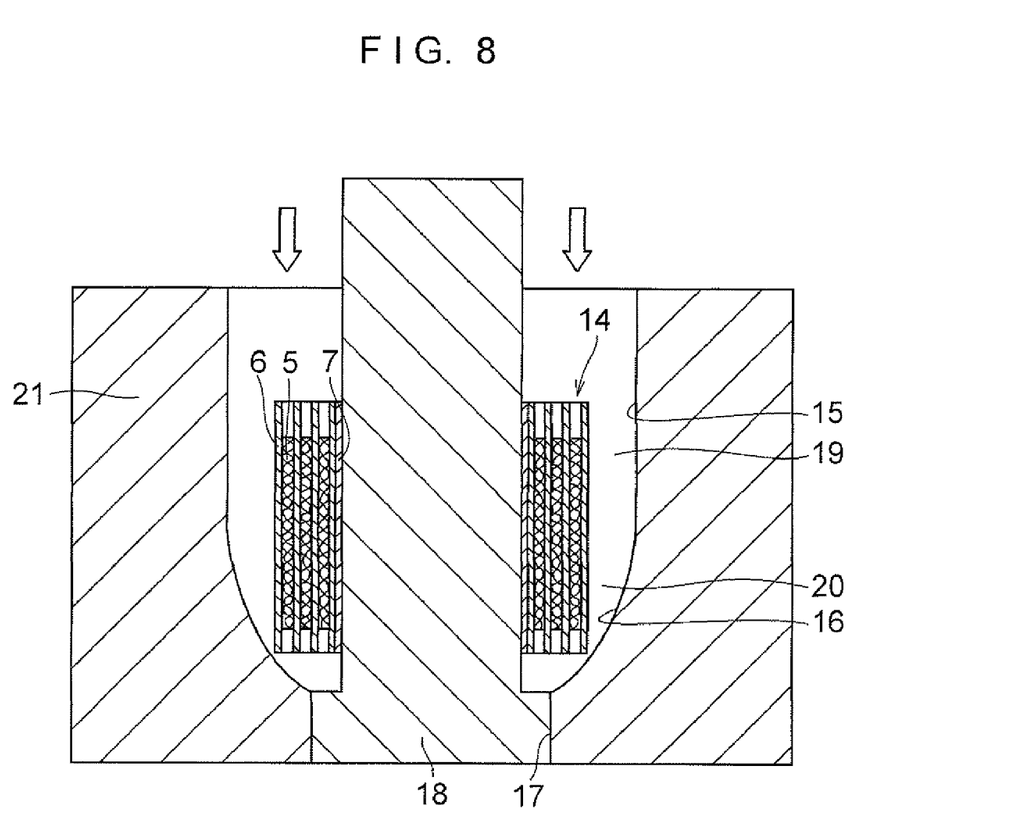
FIG. 8 is a vertical cross-sectional view illustrating a state in which the tubular base member is inserted in a die in the process of manufacturing the spherical annular seal member in accordance with the present invention.

(Seventh Process) A die 21 is prepared, as shown in FIG. 8. The die 21 has on its inner surface a cylindrical wall surface 15, a partially concave spherical wall surface 16 continuing from the cylindrical wall surface 15, and a through hole 17 continuing from the partially concave spherical wall surface 16. As a stepped core 18 is inserted and fitted in the through hole 17, a hollow portion consisting of a hollow cylindrical portion 19 and a spherical annular hollow portion 20 continuing from the hollow cylindrical portion 19 is formed in the die 21. Then, the tubular base member 14 is fitted over the stepped core 18 of the die 21.

The tubular base member 14, which is located in the hollow portion consisting of the hollow cylindrical portion 19 and the spherical annular hollow portion 20 of the die 21, is subjected to compression forming under a pressure of 1 to 3 tons/cm$^2$ in the direction of the core axis. Thus, the spherical annular seal member 28 is fabricated which includes a spherical annular base member 27 having a cylindrical inner surface 23, the partially convex spherical outer surface 24, and the large- and small-diameter-side annular end faces 25 and 26 of the partially convex spherical outer surface 24, as shown in FIG. 1, as well as a heat-expandable annular coating layer 29 composed of the mixture of acid-treated graphite and wax and formed integrally on the cylindrical inner surface 23 of the spherical annular base member 27, a through hole 22 being defined in the central portion by the inner surface of the coating layer 29.

The spherical annular seal member 28 fabricated by this compression forming is comprised of the spherical annular base member 27 defined by the cylindrical inner surface 23, the partially convex spherical outer surface 24, and the large- and small-diameter-side annular end faces 25 and 26 of the partially convex spherical outer surface 24, as well as the heat-expandable annular coating layer 29 formed integrally on the cylindrical inner surface 23 of the spherical annular base member 27. The spherical annular base member 27 is constructed so as to be provided with structural integrity as the heat-resistant material 6 and the reinforcing member 5 made from the metal wire net are compressed and intertwined with each other. The spherical annular base member 27 has the reinforcing member 5 which comprises the compressed metal wire net, as well as the heat-resistant material 6 which is constituted by expanded graphite and which fills the meshes of the metal wire net of this reinforcing member 5 and is compressed in such a manner as to be formed integrally with this reinforcing member 5 in mixed form. The heat-expandable annular coating layer 29, which is constituted by the compressed mixture of acid-treated graphite prior to expansion treatment and wax, is formed on the cylindrical inner surface 23 of the spherical annular base member 27 in such a manner as to be exposed to the outside in a through hole 22.

Figure 1:
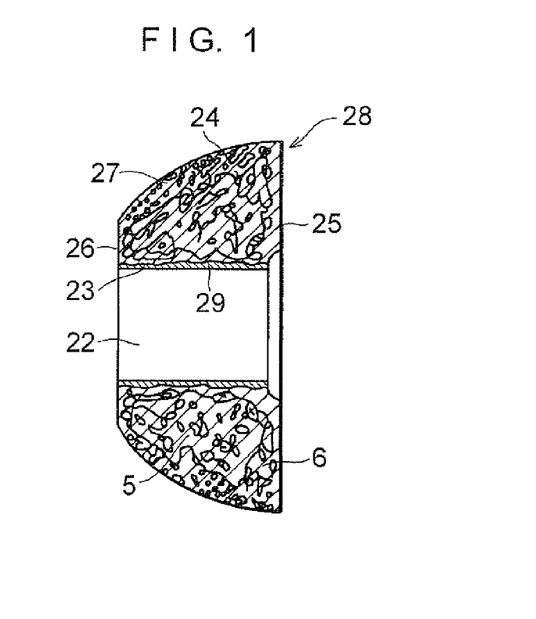
FIG. 1 is a vertical cross-sectional view illustrating a spherical annular seal member in accordance with the present invention.

In the spherical annular seal member 28 fabricated by the above-described method and shown in FIG. 1, the heat-resistant material 6 is intertwined and integrated with the reinforcing member 5 made from the metal wire net which forms the internal structure, and the partially convex spherical outer surface 24 is formed into the smooth surface of the heat-resistant material 6 constituted by expanded graphite. Further, the large-diameter-side annular end face 25 and the small-diameter-side end face 26 of the partially convex spherical outer surface 24 are covered with the heat-resistant material 6 constituted by expanded graphite as the heat-resistant material 6 jutting out from the reinforcing member 5 by δ1 and δ2 in its widthwise direction is bent to the large-diameter-side annular end face 25 and the small-diameter-side end face 26 of the partially convex spherical outer surface 24 and is extended.

Figure 9:
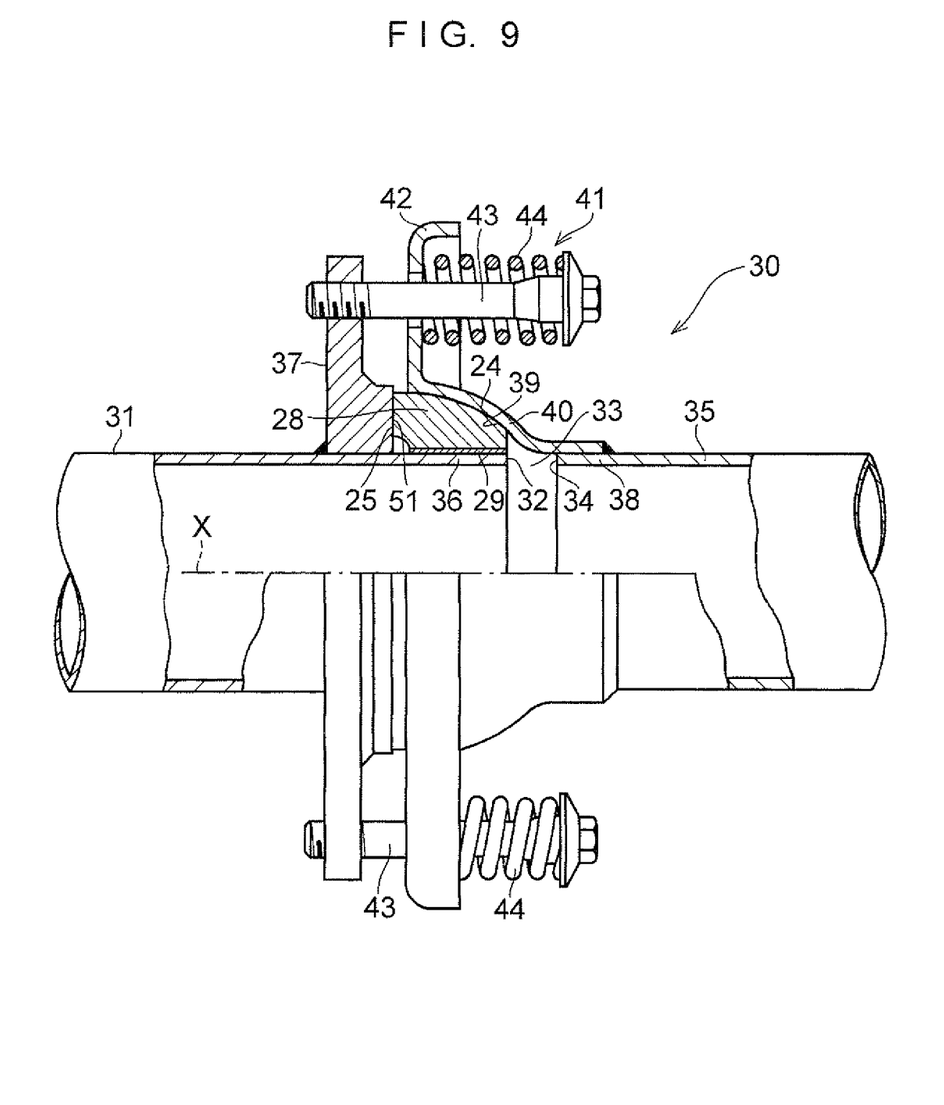
FIG. 9 is a vertical cross-sectional view of an exhaust pipe spherical joint device in which the spherical annular seal member in accordance with the present invention has been incorporated.

The above-described spherical annular seal member 28 is used in an exhaust pipe joint device 30 such as the one shown in FIG. 9. The exhaust pipe joint device 30 is comprised of an upstream-side exhaust pipe 31 connected to the engine side; a downstream-side exhaust pipe 35 connected to the atmosphere side and having an end face 34 opposing an end face 32 of the upstream-side exhaust pipe 31 with a gap 33 left therebetween; a flange 37 secured to an outer surface of a pipe end portion 36 of the upstream-side exhaust pipe 31 by welding or the like; a seal seat member 40 secured to an outer surface of a pipe end portion 38 of the downstream-side exhaust pipe 35 by welding or the like and having a partially concave spherical inner surface 39; a resilient coupling means 41 for resiliently coupling the upstream-side exhaust pipe 31 and the downstream-side exhaust pipe 35 in such a manner as to be capable of relative angular displacement; and the spherical annular seal member 28.

The spherical annular seal member 28 is fitted to the outer surface of the pipe end portion 36 of the upstream-side exhaust pipe 31 at the heat-expandable annular coating layer 29 constituted by the mixture of the acid-treated graphite and wax, is in contact with a side surface 51 substantially perpendicular to the axial direction X of the flange 37 at the large-diameter-side annular end face 25 of the spherical annular base member 27, and is in slidable contact with the partially concave spherical inner surface 39 of the seal seat member 40 at the partially convex spherical outer surface 24 of the spherical annular base member 27.

The resilient coupling means 41 has a pair of bolts 43 each disposed with one end fixed to the flange 37 and the other end penetrating a flange portion 42 extended integrally from the seal seat member 40, as well as a pair of coil springs 44 each disposed between the head of the bolt 43 and the flange portion 42 in such a manner as to surround an outer surface of the bolt 43. The upstream-side exhaust pipe 31 and the downstream-side exhaust pipe 35 are resiliently coupled to each other by the above-described resilient coupling means 41, and the downstream-side exhaust pipe 35 is constantly urged toward the upstream-side exhaust pipe 31 by the spring force of the pair of coil springs 44.

In the exhaust pipe joint device 30, the relative angular displacement occurring between the upstream-side exhaust pipe 31 and the downstream-side exhaust pipe 35 is allowed by the sliding movement between the partially convex spherical outer surface 24 of the spherical annular seal member 28 and the partially concave spherical inner surface 39 of the seal seat member 40.

According to the above-described exhaust pipe joint device 30, the spherical annular seal member 28 at its partially convex spherical outer surface 24 is in slidable contact with the partially concave spherical inner surface 39 of the seal seat member 40 secured to the pipe end portion 38 of the downstream-side exhaust pipe 35. As a result, the relative angular displacement occurring between the upstream-side exhaust pipe 31 and the downstream-side exhaust pipe 35 is allowed by the sliding movement between the partially convex spherical outer surface 24 of the spherical annular seal member 28 and the partially concave spherical inner surface 39 of the seal seat member 40. Meanwhile, the sealing between the upstream-side exhaust pipe 31 and the downstream-side exhaust pipe 35 with respect to the outside is effected by the contact between the large-diameter-side annular end face 25 of the spherical annular base member 27 and the side surface 51 of the flange 37, in addition to the close contact between the partially convex spherical outer surface 24 of the spherical annular base member 27 and the partially concave spherical inner surface 39 of the seal seat member 40.

In addition, according to the exhaust pipe joint device 30, in the spherical annular seal member 28, the heat-expandable annular coating layer 29 formed integrally on the cylindrical inner surface 23 expands in such a manner as to tighten the outer surface of the exhaust pipe owing to the heat of the exhaust gases flowing in the exhaust pipe. As a result, the integration of the spherical annular seal member 28 and the outer surface of the pipe end portion 36 of the upstream-side exhaust pipe 31 is accomplished. Thus, it is possible to reliably fix the spherical annular seal member 28 to the pipe end portion 36 of the upstream-side exhaust pipe 31, and even in a case where a force in the twisting direction (rotating direction) is applied from the downstream-side exhaust pipe 35 to the spherical annular seal member 28, sliding movement is not caused between the annular inner surface of the coating layer 29 and the outer surface of the pipe end portion 36 of the upstream-side exhaust pipe 31 and between the large-diameter-side annular end face 25 of the spherical annular base member 27 and the flange 37. Hence, abnormal friction noise caused by stick-slip and the like is not generated here, so that discomfort is not imparted to the driver.

The invention claimed is:

1. A spherical annular seal member comprising:
a spherical annular base member defined by a cylindrical inner surface, a partially convex spherical outer surface, and large- and small-diameter-side annular end faces of the partially convex spherical outer surface; and
an expandable annular coating layer formed integrally on the cylindrical inner surface of said spherical annular base member, said coating layer being composed of a mixture of heat-expendable acid-treated graphite and hydrocarbon-based wax that functions as an adhesive agent,
wherein the hydrocarbon-based wax is selected from one or more of paraffin wax, microcrystalline wax, Fisher-Tropsch wax, and polyolefin wax.

2. The spherical annular seal member according to claim 1, wherein, in the mixture of the acid-treated graphite and the wax, the weight of the wax is 0.2 to 1.5 times the weight of the acid-treated graphite in terms of a compounding ratio of the wax to the acid-treated graphite.

3. The spherical annular seal member according to claim 1, wherein said spherical annular base member is obtained by subjecting a heat-resistant material containing expanded graphite and a reinforcing member made from a metal wire net to compression forming, said heat-resistant material filling gaps in said reinforcing member made from the metal wire net.

4. An exhaust pipe joint device comprising:
an upstream-side exhaust pipe;
a downstream-side exhaust pipe having an end face opposing an end face of said upstream-side exhaust pipe with a gap left therebetween;
a flange secured to an outer surface of a pipe end portion of said upstream-side exhaust pipe;
a seal seat member secured to a pipe end portion of said downstream-side exhaust pipe and having a partially concave spherical inner surface;
resilient coupling means for resiliently coupling said upstream-side exhaust pipe and said downstream-side exhaust pipe in such a manner as to be capable of relative angular displacement; and
said spherical annular seal member according to claim 1, wherein said spherical annular seal member is fitted to the outer surface of the pipe end portion of said upstream-side exhaust pipe at an inner surface of said annular coating layer, is in contact with said flange at a large-diameter-side annular end face of said spherical annular base member, and is in slidable contact with the partially concave spherical inner surface of said seal seat member at a partially convex spherical outer surface of said spherical annular base member.

* * * * *